No. 713,638. Patented Nov. 18, 1902.
W. HEPFINGER.
EDUCATIONAL PUZZLE.
(Application filed May 7, 1902.)
(No Model.) 2 Sheets—Sheet 1.
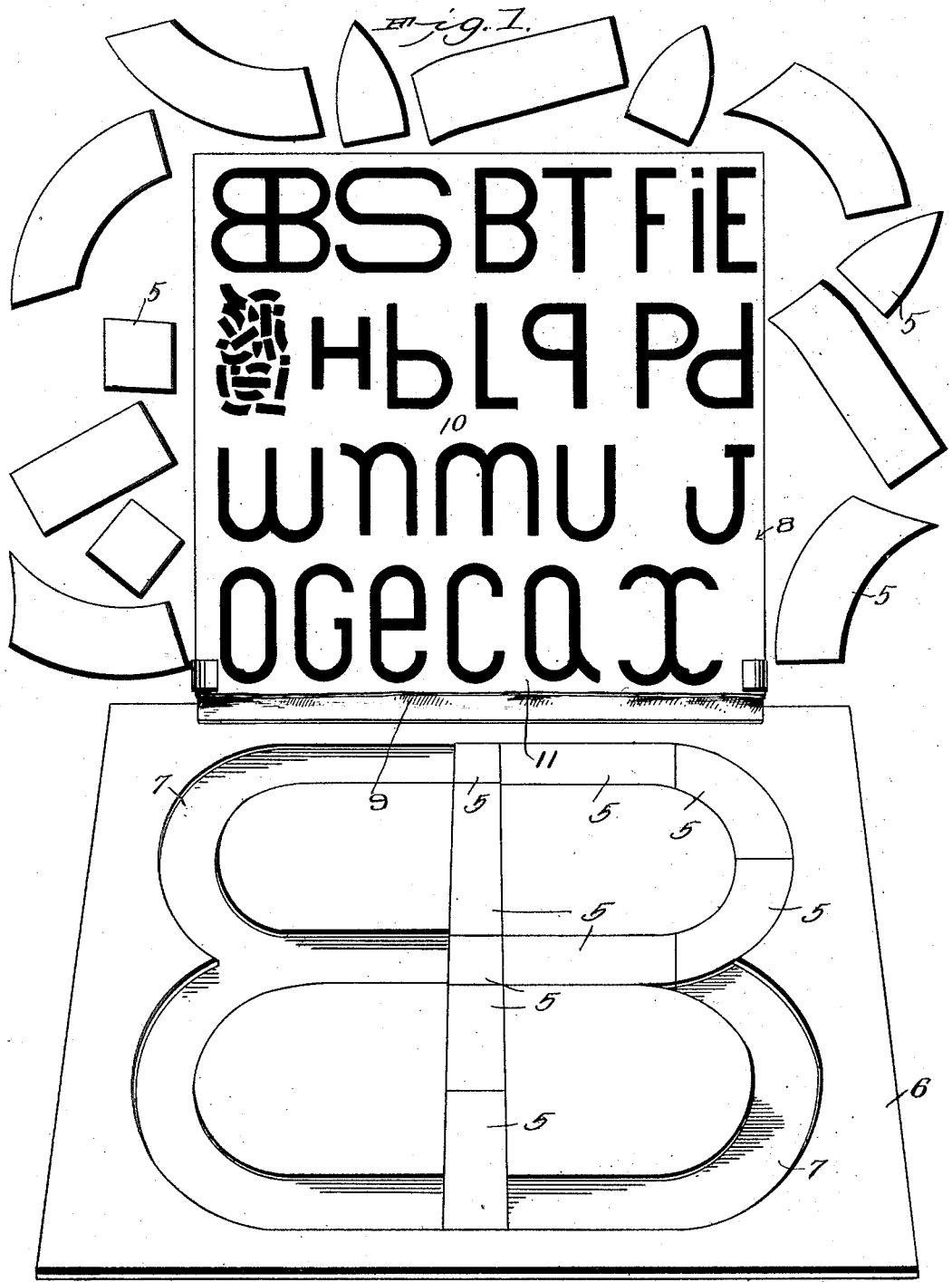

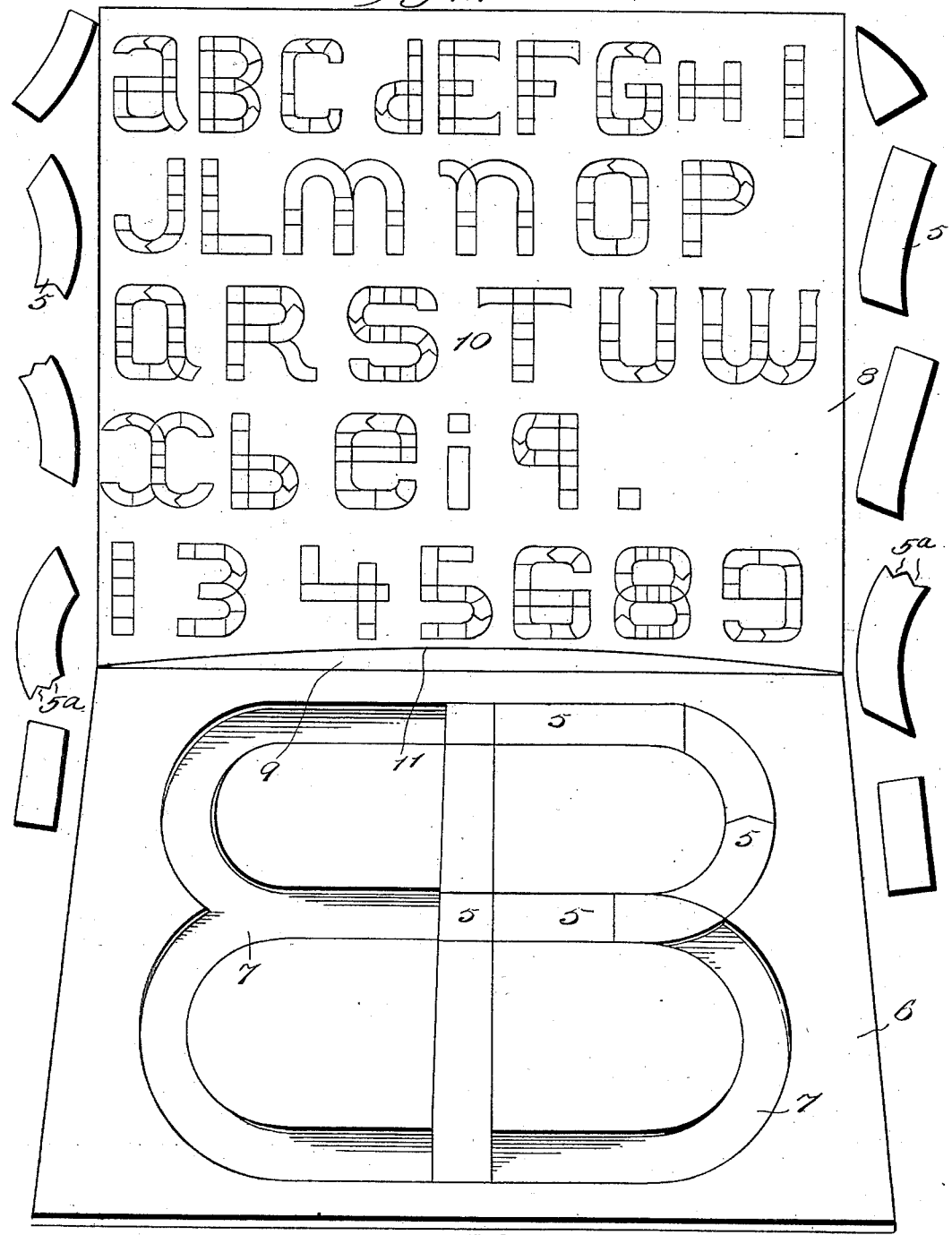

UNITED STATES PATENT OFFICE.

WILLIAM HEPFINGER, OF MONTESANO, WASHINGTON, ASSIGNOR OF ONE-HALF TO THOMAS CONNER, OF MONTESANO, WASHINGTON.

EDUCATIONAL PUZZLE.

SPECIFICATION forming part of Letters Patent No. 713,638, dated November 18, 1902.

Application filed May 7, 1902. Serial No. 106,356. (No model.)

*To all whom it may concern:*

Be it known that I, WILLIAM HEPFINGER, a citizen of the United States, residing at Montesano, in the county of Chehalis and State of Washington, have invented a new and useful Educational Puzzle, of which the following is a specification.

This invention has for its object the production of a new and improved educational puzzle or toy through the use of which the minds of children may be improved and instructed.

The invention consists in certain peculiarly-shaped blocks by the various combinations of which various characters may be formed.

The invention further consists in a plate or card having peculiarly-outlined recesses or other means to assist in forming the desired characters.

The invention further consists in a receptacle for the blocks connected to the plate or card and foldable therewith, whereby a closure is formed for the receptacle.

The invention further consists in a diagram or chart of the characters possible to be formed by the blocks, and attached to or forming part of the plate, all as hereinafter shown and described, and specifically pointed out in the claims.

In the drawings illustrative of the invention, Figure 1 represents the device with the blocks removed from the envelop and a portion of them arranged on the guiding-card and the remainder grouped about the envelop portion. Fig. 2 represents a similar view illustrating some modifications in the construction.

In this invenion are comprised four members or portions, a series of peculiarly-shaped blocks represented at 5, a plate or card represented at 6 and having recesses or cavities 7, adapted to receive the blocks or other means adapted to assist in forming the characters, a pocket or receptacle for the blocks when not in use and represented at 8 with one side open, as at 9, and attached to one edge of the plate 6, as shown, and a diagram or chart of the characters possible to be formed by the combination of the blocks and represented at 10.

The plate or card 6 may be of any material or size, but will generally be of cardboard, with recesses 7 embossed or sunken into the upper surface by pressure or by other means. The recesses may be of any form required to cause them to conform to the configuration of the blocks; but the form shown will be preferable and will enable the blocks to form all the characters denoted upon the chart upon the inner side of the receptacle. These recesses conform somewhat to the figure 8, with the upper and lower parts flattened, as shown. The blocks are formed of a series of squares, oblongs, curved and pointed or spear-head-shaped characters, as shown, and may be of any desired material, but will generally be of heavy cardboard.

The receptacle portion of the device is formed envelop or bag shaped, as shown, with one side 11 open and attached by one flap of the open side to one edge of the plate or card 6, as shown, so that when the blocks 5 are inserted in the receptacle and the latter folded over upon the plate 6 the opening to the receptacle will be closed and the escape of the blocks prevented. Thus the device may be readily transported without danger of losing any of the blocks.

By slight modifications in the outline of the blocks and the recesses a great variety of characters may be formed and the device thus adapted to a wide range of uses, and I do not, therefore, desire to be limited to any specific form or arrangement of characters or the recesses in the card or table.

In Fig. 2 a slight modification in the arrangement of the chart 10 upon the back 8 of the envelop is shown, consisting in a somewhat more varied arrangement of the characters which it is possible to form with the blocks 5. In this modification also the adjacent ends of some of the blocks are provided with interengaging serrations, as at 5ᵃ, to complicate the labor of forming the characters, and thus add to the difficulty of arranging them and correspondingly increase the interest in the operation of the device.

While it is preferable that the means for assisting in forming the characters shall be in the form of shallow recesses, as shown, any modification which would accomplish the same result would clearly come within the scope of and be covered by the invention.

Having thus described my invention, what I claim is—

1. In an educational puzzle, a series of blocks of diversified shapes and capable of being combined to form characters, in combination with a plate having outlined thereon characters adapted to be formed by properly combining said blocks, substantially as described.

2. In an educational puzzle, a series of blocks of diversified shapes and capable of being combined to form characters, in combination with a plate having outlined thereon characters adapted to be formed by properly combining said blocks, and a chart of the characters capable of being formed by said blocks, substantially as described.

3. In an educational puzzle, a series of blocks of diversified shapes and capable of being combined to form characters, a plate having outlined thereon means for assisting in forming said combinations of characters, and a receptacle for said blocks attached to said plate, substantially as described.

4. In an educational puzzle, a series of blocks of diversified shapes and capable of being combined to form characters, in combination with a plate recessed to correspond with the outline of characters capable of being formed by combinations of said blocks, substantially as described.

5. In an educational puzzle, a series of blocks of diversified shapes and capable of being combined to form characters, a plate having outlined thereon means for assisting in forming said combinations of characters, a receptacle for said blocks attached to said plate, and a chart of the characters possible to be formed by said blocks disposed upon said receptacle, substantially as described.

6. In an educational puzzle, a series of blocks of diversified shapes and capable of being combined to form characters, a plate having outlined thereon means for assisting in forming said combinations and characters, a receptacle for said blocks open at one side and secured along said open side to said plate, substantially as described.

In testimony that I claim the foregoing as my own I have hereto affixed my signature in the presence of two witnesses.

WILLIAM HEPFINGER.

Witnesses:
L. H. BREWER,
E. M. DOYLE.